(12) United States Patent
Nishikawa (10) Patent No.: US 9,897,160 B2
(45) Date of Patent: Feb. 20, 2018

(54) VIBRATION ISOLATOR

(71) Applicant: BRIDGESTONE CORPORATION, Tokyo (JP)

(72) Inventor: Keita Nishikawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/113,344

(22) PCT Filed: Mar. 13, 2015

(86) PCT No.: PCT/JP2015/057486
§ 371 (c)(1),
(2) Date: Jul. 21, 2016

(87) PCT Pub. No.: WO2015/190145
PCT Pub. Date: Dec. 17, 2015

(65) Prior Publication Data
US 2017/0002891 A1  Jan. 5, 2017

(30) Foreign Application Priority Data
Jun. 13, 2014 (JP) ................. 2014-122439

(51) Int. Cl.
*F16F 5/00* (2006.01)
*F16F 13/10* (2006.01)

(52) U.S. Cl.
CPC ........... *F16F 13/107* (2013.01); *F16F 13/10* (2013.01)

(58) Field of Classification Search
CPC ....................... F16F 13/105–13/107
(Continued)

(56) References Cited

U.S. PATENT DOCUMENTS 4,697,793 A * 10/1987 Reuter ................. F16F 13/105
                                                     267/140.13
4,938,463 A *  7/1990 Miyamoto ............ F16F 13/106
                                                     267/140.13
(Continued)

FOREIGN PATENT DOCUMENTS

CN     1796821 A    7/2006
CN   103620258 A    3/2014
(Continued)

OTHER PUBLICATIONS

Communication dated Mar. 8, 2017 from the State Intellectual Property Office of the P.R.C. in counterpart Application No. 201580008965.8.
(Continued)

*Primary Examiner* — Christopher Schwartz
(74) *Attorney, Agent, or Firm* — Sughrue Mion, PLLC (57) ABSTRACT

A vibration isolator of the present invention includes a first attachment member (11), a second attachment member (12), an elastic body (13), a partition member (15), and a movable member (23). In addition, a plurality of communicating holes (27a and 27b) extending outward in an axial direction from a portion facing the movable member (23) in the axial direction in a wall surface of an accommodating chamber (18) and configured to communicate the accommodating chamber (18) with a main liquid chamber (16a) or a subsidiary liquid chamber (16b) are provided in the partition member (15), at least one of the plurality of communicating holes (27a and 27b) is a direct coupling hole (27a) configured to directly couple the accommodating chamber (18) with the main liquid chamber (16a) or the subsidiary liquid chamber (16b) in the axial direction, a flow control member (30) positioned at an outside in the axial direction relative to the direct coupling hole (27a) and disposed to overlap the movable member (23) in the axial direction through the
(Continued)

direct coupling hole (27*a*) is further provided, and the flow control member (30) does not come into contact with the movable member (23) deformed in the axial direction when a liquid pressure of the main liquid chamber (16*a*) varies based on an input from a vibration-generating part.

4 Claims, 3 Drawing Sheets

(58) Field of Classification Search
USPC ..................................... 267/140.13–140.15
See application file for complete search history.

(56) References Cited

U.S. PATENT DOCUMENTS

| | | | | |
|---|---|---|---|---|
| 5,104,100 | A * | 4/1992 | Simuttis | F16F 13/106 267/140.13 |
| 6,622,995 | B2 * | 9/2003 | Baudendistel | F16F 13/305 267/140.14 |
| 7,306,210 | B2 * | 12/2007 | Happou | F16F 13/262 267/140.13 |
| 8,196,700 | B2 * | 6/2012 | Toba | F16F 13/106 181/148 |
| 8,894,051 | B2 * | 11/2014 | Yamamoto | F16F 13/106 267/140.13 |
| 2006/0097435 | A1 | 5/2006 | Yoneyama et al. | |
| 2006/0097436 | A1 * | 5/2006 | Yamamoto | F16F 13/101 267/140.12 |
| 2007/0090579 | A1 * | 4/2007 | Noe | F16F 13/103 267/140.13 |
| 2009/0283945 | A1 * | 11/2009 | Kojima | F16F 13/107 267/140.13 |
| 2012/0074629 | A1 * | 3/2012 | Yamamoto | F16F 13/106 267/140.13 |
| 2014/0103586 | A1 * | 4/2014 | Tsutsumi | F16F 13/106 267/140.13 |
| 2015/0337919 | A1 | 11/2015 | Kojima | |

FOREIGN PATENT DOCUMENTS

| | | |
|---|---|---|
| JP | 2010-031989 A | 2/2010 |
| JP | 2010-116962 A | 5/2010 |
| JP | 4740776 B2 | 8/2011 |
| JP | 2011-185291 A | 9/2011 |
| JP | 2013-015177 A | 1/2013 |
| JP | 2014-005880 A | 1/2014 |

OTHER PUBLICATIONS

Communication dated Mar. 27, 2017 from the European Patent Office in counterpart Application No. 15807423.7.
International Search Report for PCT/JP2015/057486 dated May 26, 2015 [PCT/ISA/210].
Written Opinion for PCT/JP2015/057486 dated May 26, 2015 [PCT/ISA/237].

\* cited by examiner

VIBRATION ISOLATOR

CROSS REFERENCE TO RELATED APPLICATIONS

This application is a National Stage of International Application No. PCT/JP2015/057486 filed Mar. 13, 2015, claiming priority based on Japanese Patent Application Nos. 2014-122439 filed Jun. 13, 2014, the contents of all of which are incorporated herein by reference in their entirety.

TECHNICAL FIELD

The present invention relates to a vibration isolator which is applied to, for example, vehicles, industrial machines, etc. and absorbs and attenuates vibrations of vibration-generating parts such as engines.

Priority is claimed on Japanese Patent Application No. 2014-122439, filed Jun. 13, 2014, the content of which is incorporated herein by reference.

BACKGROUND ART

Constitutions such as that disclosed in, for example, Patent Document 1 are known as this type of vibration isolator. This vibration isolator includes a first tubular attachment member coupled to one of a vibration-generating part and a vibration-receiving part, a second attachment coupled to the other part, an elastic body configured to couple the attachment members to each other, a partition member configured to divide a liquid chamber in the first attachment member in which a liquid is sealed into a main liquid chamber having the elastic body as a portion of a wall surface and a subsidiary liquid chamber, and a movable member accommodated in an accommodating chamber provided at the partition member deformably in the axial direction of the first attachment member. A plurality of communicating holes extending outward in the axial direction from a portion of a wall surface of the accommodating chamber facing the movable member in the axial direction and configured to communicate the accommodating chamber with the main liquid chamber or the subsidiary liquid chamber are provided in the partition member. The communicating hole configured to communicate the accommodating chamber with the main liquid chamber among the plurality of communicating holes directly couples the accommodating chamber and the main liquid chamber in the axial direction.

DOCUMENT OF RELATED ART

Patent Document

Patent Document 1

Japanese Unexamined Patent Application, First Publication No. 2011-185291

SUMMARY OF INVENTION

Technical Problem

However, the movable member may be deformed in the axial direction to come into contact with the wall surface of the accommodating chamber when the liquid pressure of the main liquid chamber varies based on the input from the vibration-generating part in the conventional vibration isolator, thereby generating large abnormal noise due to, for example, vibrations of the partition member, etc.

The present invention was made in view of the above-described circumstances, and an object of the present invention is to suppress abnormal noise occurring with input from the vibration-generating part.

Solution to Problem

A vibration isolator related to the present invention in which a plurality of communicating holes extending outward in an axial direction from a portion of a wall surface of an accommodating chamber facing a movable member in the axial direction and configured to communicate the accommodating chamber with a main liquid chamber or a subsidiary liquid chamber are provided in a partition member, and at least one of the plurality of communicating holes is a direct coupling hole configured to directly couple the accommodating chamber with the main liquid chamber or the subsidiary liquid chamber in the axial direction, the vibration isolator including: a first tubular attachment member coupled to one of a vibration-generating part and a vibration-receiving part and a second attachment member coupled to the other part; an elastic body configured to couple the attachment members to each other; the partition member configured to divide a liquid chamber in the first attachment member in which a liquid is sealed into the main liquid chamber having the elastic body as a portion of a wall surface and the subsidiary liquid chamber; the movable member accommodated in the accommodating chamber provided at the partition member deformably or displaceably in the axial direction of the first attachment member; and a flow control member positioned closer to an outside in the axial direction than the direct coupling hole and disposed to overlap the movable member in the axial direction through the direct coupling hole, wherein the flow control member does not come into contact with the movable member deformed or displaced in the axial direction when a liquid pressure of the main liquid chamber varies based on an input from the vibration-generating part.

In this case, the movable member is affected by a dynamic pressure of the liquid of the main liquid chamber or the subsidiary liquid chamber through the direct coupling holes when the liquid pressure of the main liquid chamber varies based on the input from the vibration-generating part, and a pressure difference occurs between the main liquid chamber and the subsidiary liquid chamber. At this time, the movable member is not directly affected by the dynamic pressure, but the movable member is affected by the dynamic pressure through the flow control member so that a direction and a size of a pressure gradient of the liquid in the vicinity of the movable member are changed due to the flow control member. Thus, for example, a deformation rate, a displacement rate, etc. of the movable member is suppressed when the movable member is deformed or displaced in the axial direction to come into contact with the wall surface of the accommodating chamber so that kinetic energy of the movable member can be suppressed. Also, in this case, since the movable member does not come into contact with the flow control member, abnormal noise can be suppressed.

As described above, abnormal noise can be suppressed by simply providing the flow control member, and abnormal noise can be suppressed without changing sizes of the direct coupling holes or a positional relationship between the partition member and the movable member. Therefore, abnormal noise can be suppressed while effects caused in characteristics of the vibration isolator such as, for example, frequency characteristics, attenuation characteristics, and cavitation characteristics are suppressed.

The movable member may include a fixed portion fixed to the partition member in the axial direction and may be formed deformably in the axial direction, and the flow control member may overlap a portion that is farthest from the fixed portion in a planar view of the partition member when viewed from the axial direction in an exposed area exposed from the direct coupling hole in the axial direction in the movable member in the axial direction.

In this case, since the movable member includes the fixed portion, a portion of the movable member which is farther from the fixed portion in the planar view is easily deformed in the axial direction. Here, since the flow control member overlaps the portion that is farthest from the fixed portion in the planar view in the exposed area of the movable member in the axial direction, a portion that is most easily deformed in the axial direction in the exposed area can be suppressed from being directly affected by the dynamic pressure of the liquid. Thus, abnormal noise can be effectively suppressed.

The exposed area of the movable member may be disposed on a hole axis of the direct coupling hole, the fixed portion may be provided at a portion other than the exposed area, and the flow control member may overlap a portion that is positioned at an opposite side of the fixed portion surrounding the hole axis in the exposed area in the axial direction and extend in a direction around the hole axis.

In this case, the flow control member overlaps the portion that is positioned at the opposite side of the fixed portion surrounding the hole axis of the direct coupling hole in the exposed area of the movable member in the axial direction and extends in the direction around the hole axis. Thus, a portion that is easily deformed in the axial direction in the exposed area of the movable member can be covered by the flow control member over a wide range so that abnormal noise can be more effectively suppressed.

Effects of Invention

According to the present invention, abnormal noise occurring with input from the vibration-generating part can be suppressed.

DESCRIPTION OF EMBODIMENTS

Hereinafter, an embodiment of the present invention will be described based on the drawings.

Figure 1:
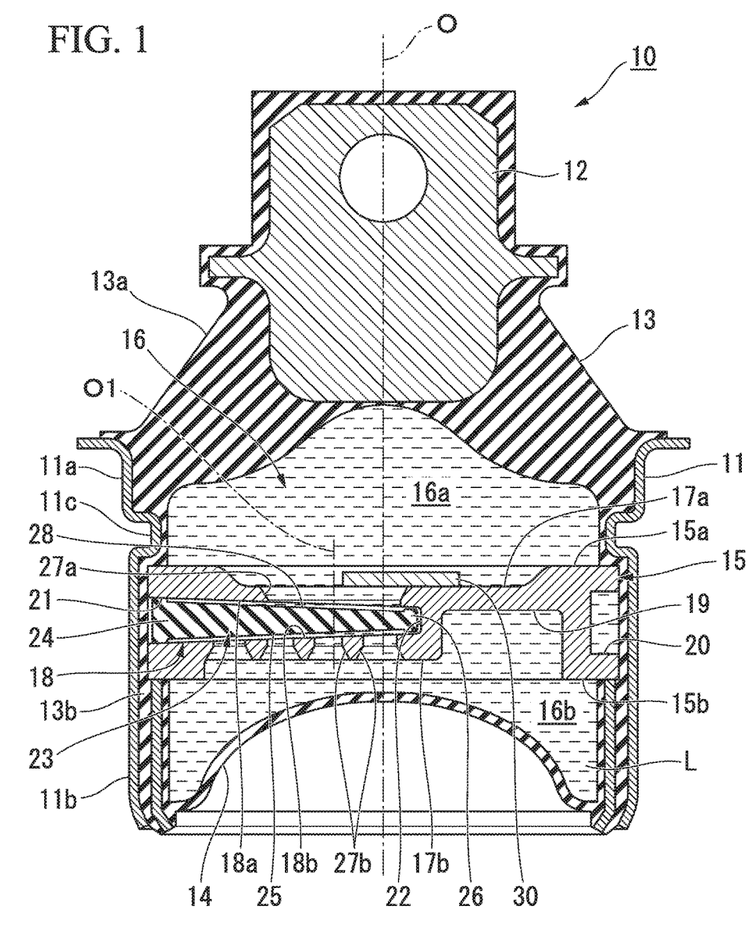
FIG. 1 is a longitudinal cross-sectional view of a vibration isolator according to an embodiment of the present invention.

As shown in FIG. 1, a vibration isolator 10 includes a first tubular attachment member 11 coupled to one of a vibration-generating part and a vibration-receiving part, a second attachment member 12 coupled to the other part, an elastic body 13 configured to elastically couple the first attachment member 11 and the second attachment member 12, and a partition member 15 disposed inside the first attachment member 11 and configured to divide a liquid chamber 16 formed inside the first attachment member 11 into a main liquid chamber 16a and a subsidiary liquid chamber 16b.

Note that such members are provided coaxially with a central axis O. Hereinafter, a direction along the central axis O is referred to as an axial direction (an axial direction of the first attachment member), a direction perpendicular to the central axis O is referred to as a radial direction, and a direction around the central axis O is referred to as a circumferential direction.

Here, the above-described liquid chamber 16 is divided into the main liquid chamber 16a of one side in the axial direction (the upper side of FIG. 1) having the elastic body 13 as a portion of a wall surface and the subsidiary liquid chamber 16b of the other side in the axial direction (the lower side of FIG. 1) by the partition member 15.

A liquid L such as, for example, ethylene glycol, water, or silicone oil is sealed in the main liquid chamber 16a and the subsidiary liquid chamber 16b.

The vibration isolator 10 is mounted on, for example, a vehicle, etc. and suppresses vibration of an engine from being transferred to a vehicle body. In the vibration isolator 10, the second attachment member 12 is coupled to the engine (not shown) serving as the vibration-generating part, and the first attachment member 11 is coupled to the vehicle body serving as the vibration-receiving part via a bracket (not shown).

The first attachment member 11 includes a first cylinder portion 11a formed at the one side in the axial direction, a second cylinder portion 11b formed at the other side in the axial direction, and a stepped portion 11c configured to couple the first cylinder portion 11a and the second cylinder portion 11b. The first cylinder portion 11a, the second cylinder portion 11b, and the stepped portion 11c are disposed coaxially with the central axis O and formed as a single body. An end of the first attachment member 11 of the one side in the axial direction is closed by the elastic body 13 in a liquid-tight state and an end of the first attachment member 11 of the other side in the axial direction is closed by a diaphragm 14 in a liquid-tight state so that the liquid L can be sealed inside the first attachment member 11.

The second attachment member 12 is disposed at the one side in the axial direction relative to the first cylinder portion 11a of the first attachment member 11.

The elastic body 13 is a member made of, for example, a rubber material, etc. The elastic body 13 includes a deformation portion 13a protruding toward the one side in the axial direction from the end of the first attachment member 11 of the one side in the axial direction and having a truncated conical shape whose diameter is gradually decreased toward the one side in the axial direction and a covered portion 13b extending toward the other side in the axial direction along an inner circumferential surface of the first attachment member 11 from the deformation portion 13a.

The covered portion 13b is vulcanization-adhered to the inner circumferential surface of the first attachment member 11, and the inner circumferential surface of the first attachment member 11 is covered with the elastic body 13 over the entire area. The deformation portion 13a and the covered portion 13b are formed as a single body.

Figure 2:
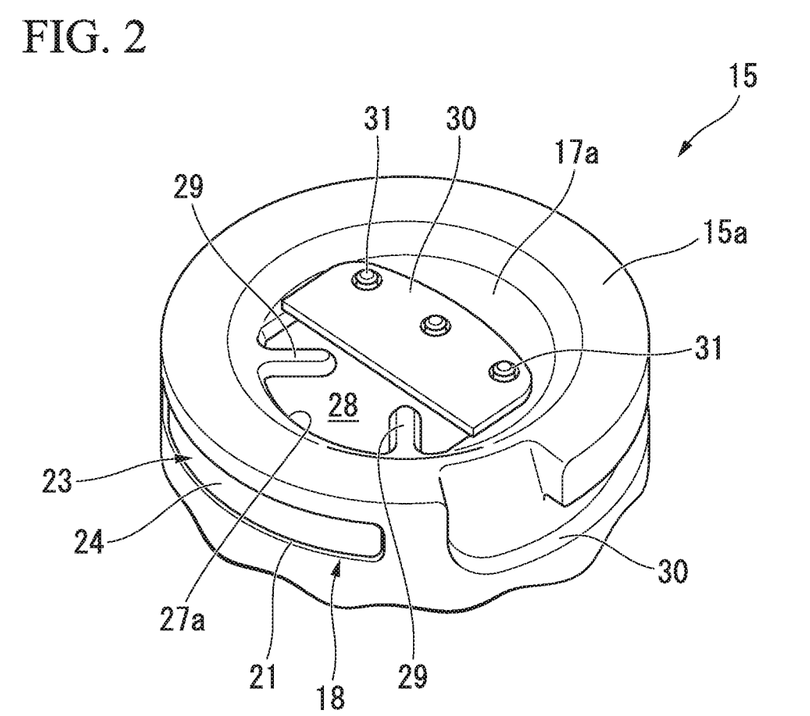
FIG. 2 is a perspective view of a partition member constituting the vibration isolator shown in FIG. 1.

As shown in FIGS. 1 and 2, the partition member 15 is formed as a single body using, for example, an aluminum alloy, a resin, etc. The partition member 15 is formed in a discoid shape and is fitted into the first attachment member 11 (into the covered portion 13b). A first outer end surface 15a of the partition member 15 facing the one side in the axial direction faces the main liquid chamber 16a, and the partition member 15 forms a portion of a partition of the main liquid chamber 16a. A second outer end surface 15b of the partition member 15 facing the other side in the axial direction faces a side of the subsidiary liquid chamber 16b, and the partition member 15 forms a portion of a partition of the subsidiary liquid chamber 16b.

First and second concave portions 17a and 17b, respectively, recessed inward in the axial direction are formed at the first outer end surface 15a and the second outer end surface 15b. The first concave portion 17a which is the concave portion formed at the first outer end surface 15a and the second concave portion 17b which is the concave portion formed at the second outer end surface 15b are both disposed coaxially with the central axis O.

An accommodating chamber 18, a thin portion 19, and a restriction passage 20 are provided at the partition member 15. The accommodating chamber 18, the thin portion 19, and the restriction passage 20 are independent of each other.

The accommodating chamber 18 is positioned between the first concave portion 17a and the second concave portion 17b in the axial direction. The accommodating chamber 18 is disposed to be shifted with respect to the central axis O. The accommodating chamber 18 is eccentric to the central axis O and intersects the central axis O. A part of the accommodating chamber 18 in the circumferential direction is open to the outside in the radial direction from an outer circumferential surface of the partition member 15, and the remaining part thereof in the circumferential direction is closed from the outside in the radial direction.

An opening 21 which opens outward in the radial direction and a closed portion 22 positioned at the opposite side of the opening 21 surrounding the central axis O are provided at the accommodating chamber 18. The closed portion 22 is surrounded by the first concave portion 17a and the second concave portion 17b in the axial direction. A size of the accommodating chamber 18 in the axial direction differs according to a position in forward and rearward directions along an opening axis of the opening 21. The accommodating chamber 18 gradually becomes smaller in the axial direction from a rear side which is a side of the opening 21 in the forward and rearward directions toward a front side which is a side of the closed portion 22.

End surfaces 18a and 18b in wall surfaces of the accommodating chamber 18 facing the inner side in the axial direction are both inclined with respect to the central axis O. The first inner end surface 18a at a side of the main liquid chamber 16a between the end surfaces 18a and 18b gradually extends toward the lower side (the other side in the axial direction) as it goes toward the front side, and the second inner end surface 18b at a side of the subsidiary liquid chamber 16b gradually extends toward the upper side (the one side in the axial direction) as it goes toward the front side.

The thin portion 19 is recessed toward the one side in the axial direction from the second concave portion 17b and is disposed to avoid the accommodating chamber 18.

The restriction passage 20 communicates the main liquid chamber 16a with the subsidiary liquid chamber 16b. The restriction passage 20 extends along the outer circumferential surface of the partition member 15 in the circumferential direction and is disposed to avoid the accommodating chamber 18 and the thin portion 19. The restriction passage 20 is tuned such that resonance (liquid column resonance) occurs, for example, when engine shake vibrations with frequencies of approximately 10 Hz are input.

Here, a movable member 23 (a movable plate or a membrane) is disposed in the accommodating chamber 18. The movable member 23 is accommodated in the accommodating chamber 18 deformably in the axial direction. For example, the movable member 23 is inserted into the accommodating chamber 18 toward the front side in the forward and rearward directions from the opening 21 of the accommodating chamber 18 so that the movable member 23 is accommodated in the accommodating chamber 18. The movable member 23 is formed in a plate shape whose front and rear surfaces face the axial direction using, for example, a rubber material, etc. and can be elastically deformed. The movable member 23 is deformed in the axial direction according to a pressure difference between the main liquid chamber 16a and the subsidiary liquid chamber 16b.

The movable member 23 has a shape similar to that of the accommodating chamber 18. A thickness which is a size of the movable member 23 in the axial direction gradually becomes smaller toward the front side in the forward and rearward directions. An end of the movable member 23 of the rear side in the forward and rearward directions is a fixed end 24 (a fixed portion) fixed to the partition member 15 in the axial direction. The fixed end 24 is fitted into the opening 21 in a liquid-tight manner throughout the entire circumference of the opening 21 and regulates the liquid L in the accommodating chamber 18 from being leaked from the opening 21.

A gap is formed between a deformation portion 25 positioned closer to the front side than the fixed end 24 in the movable member 23 and the wall surfaces of the accommodating chamber 18 over the entire area. A gap in the axial direction is formed between both surfaces facing the axial direction in the movable member 23 and the end surfaces 18a and 18b of the accommodating chamber 18.

An end of the movable member 23 of the front side in the forward and rearward directions is a free end 26 which is farthest from the fixed end 24 in a planar view of the partition member 15 when viewed from the axial direction. The free end 26 is an end of the movable member 23 at an opposite side of the fixed end 24.

Here, a plurality of communicating holes 27a and 27b (direct coupling holes) are further provided in the partition member 15. The plurality of communicating holes 27a and 27b extend outward in the axial direction from a portion facing the movable member 23 in the axial direction in the wall surface of the accommodating chamber 18 and communicate the accommodating chamber 18 with the main liquid chamber 16a or the subsidiary liquid chamber 16b. In the embodiment, the first communicating hole 27a configured to communicate the accommodating chamber 18 with the main liquid chamber 16a and the second communicating holes 27b configured to communicate the accommodating chamber 18 with the subsidiary liquid chamber 16b are provided as the communicating holes 27a and 27b.

The first communicating hole 27a directly couples the accommodating chamber 18 and the main liquid chamber 16a in the axial direction and is open in the main liquid chamber 16a outward in the axial direction. One first communicating hole 27a is provided.

The first communicating hole 27a is provided at a bottom of the first concave portion 17a. A hole axis O1 of the first communicating hole 27a is shifted with respect to the central axis O. The first communicating hole 27a is larger in the axial direction than a gap between the surface of the movable member 23 and the first inner end surface 18a of the accommodating chamber 18 in the axial direction.

The first communicating hole 27a exposes a portion which is positioned closer to the rear side than the free end 26 in the deformation portion 25 of the movable member 23 toward the main liquid chamber 16a in the axial direction so that the fixed end 24 is not exposed. The movable member 23 is exposed over the entire area of the first communicating hole 27a, and an exposed area 28 exposed in the axial direction from the first communicating hole 27a in the movable member 23 is disposed on the hole axis O1 of the first communicating hole 27a.

Regulating parts 29 protrude from an inner circumferential surface of the first communicating hole 27a. The regulating parts 29 suppress the movable member 23 from being separated from the accommodating chamber 18 via the first communicating hole 27a. The regulating parts 29 come into contact with the deformed movable member 23 and regulate further deformation of the movable member 23. The plurality of regulating parts 29 are disposed at an interval in a direction around the hole axis O1 of the first communicating hole 27a. The regulating parts 29 do not protrude toward the outside in the axial direction from the first communicating hole 27a.

A plurality of the second communicating holes 27b are provided. All of the second communicating holes 27b directly couple the accommodating chamber 18 and the subsidiary liquid chamber 16b in the axial direction and are open in the subsidiary liquid chamber 16b outward in the axial direction. The plurality of second communicating holes 27b are provided in a bottom of the second concave portion 17b at an interval. The second communicating holes 27b expose a portion positioned closer to the rear side than the free end 26 in the deformation portion 25 of the movable member 23 in the axial direction toward the subsidiary liquid chamber 16b. The second communicating holes 27b are larger in the axial direction than a gap between the surface of the movable member 23 and the second inner end surface 18b of the accommodating chamber 18 in the axial direction.

Figure 3:
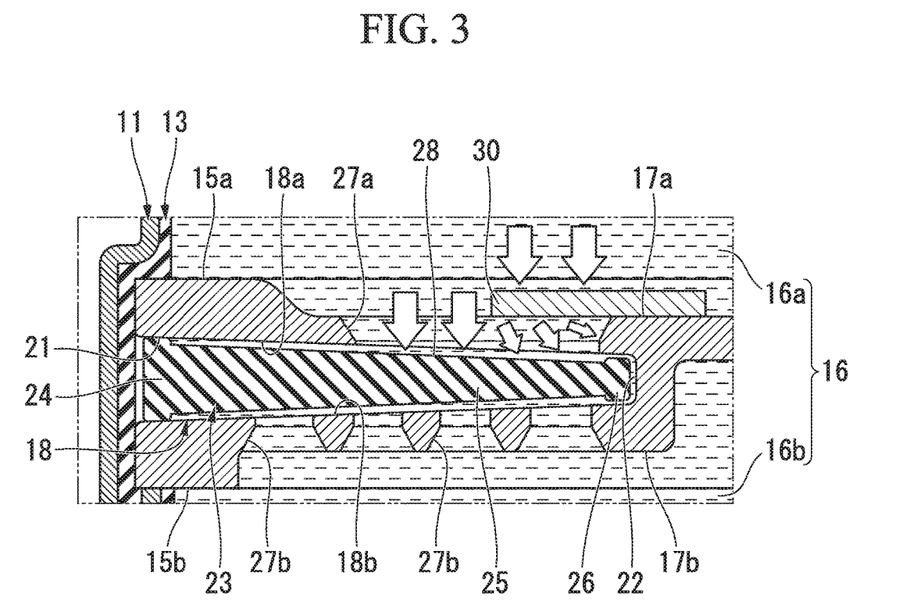
FIG. 3 is an enlarged view of a major part in the vibration isolator shown in FIG. 1.

Here, the vibration isolator 10 further includes a flow control member 30 (a flow control plate). The flow control member 30 is positioned at the outside in the axial direction relative to the first communicating hole 27a and is disposed to overlap the movable member 23 in the axial direction via the first communicating hole 27a. Front and rear surfaces of the flow control member 30 are formed in a plate shape which faces the axial direction. The flow control member 30 is formed by a rigid body and has the same rigidity as the partition member 15. Rigidity of the flow control member 30 is set to an extent that the flow control member 30 is not deformed, for example, when a dynamic pressure of the liquid L is exerted on the flow control member 30 based on an input from the vibration-generating part.

The flow control member 30 is disposed in the first concave portion 17a and is fixed to the partition member 17. The flow control member 30 is smaller in the axial direction than the first concave portion 17a and the first communicating hole 27a. The flow control member 30 is fixed to the bottom of the first concave portion 17a and is accommodated in the first concave portion 17a. The flow control member 30 overlaps a portion of the exposed area 28 of the movable member 23 which is farthest from the fixed end 24 in the planar view in the axial direction. The flow control member 30 overlaps a portion of the exposed area 28 at the front side (the opposite side of the fixed end 24 surrounding the hole axis O1 of the first communicating hole 27a) in the axial direction and extends in a direction around the hole axis O1 of the first communicating hole 27a.

The flow control member 30 continuously extends around the hole axis O1 and covers a portion of the exposed area of the movable member 23 at the front side over the entire area around the hole axis O1.

A part of the flow control member 30 covers the exposed area 28 of the movable member 23 in the axial direction, and the remaining part thereof is fixed to the partition member 15. In the embodiment, a rear portion of the flow control member 30 at the rear side covers the exposed area 28 in the axial direction, and a front portion thereof at the front side is fixed to the bottom of the first concave portion 17a. The front portion of the flow control member 30 is fixed to the bottom of the first concave portion 17a using bolts 31. The rear portion of the flow control member 30 is adjacent to the first communicating hole 27a in the axial direction. The rear portion of the flow control member 30 does not come into contact with the movable member 23 deformed in the axial direction when a liquid pressure of the main liquid chamber 16a varies based on the input of the vibration-generating part. The flow control member 30 is away from the movable member 23 regardless of the presence or absence of the input from the vibration-generating part.

Next, an action of the vibration isolator 10 with such a constitution will be described.

The movable member 23 is deformed in the accommodating chamber 18 in the axial direction when vibrations (e.g., idle vibrations with frequencies of approximately 30 Hz) with minute amplitudes (e.g., ±0.2 mm or less) are exerted on the vibration isolator 10, and pressure of the liquid L in the main liquid chamber 16a varies. Thus, the vibrations can be absorbed and attenuated.

The movable member 23 comes into contact with the end surfaces 18a and 18b of the accommodating chamber 18 in the partition member 15 to close the communicating holes 27a and 27b when vibrations with greater amplitudes than the above-described minute amplitudes (e.g., engine shake vibrations with frequencies of approximately 10 Hz) are exerted on the vibration isolator 10, and the pressure of the liquid L in the main liquid chamber 16a varies. In this case, the liquid L flows between the main liquid chamber 16a and the subsidiary liquid chamber 16b through the restriction passage 20, and liquid column resonance occurs. Thus, the vibrations can be absorbed and attenuated.

As described above, according to the vibration isolator 10 related to the embodiment, the movable member 23 is affected by a dynamic pressure of the liquid L of the main liquid chamber 16a through the first communicating hole 27a when the liquid pressure of the main liquid chamber 16a varies based on the input from the vibration-generating part, and a pressure difference occurs between the main liquid chamber 16a and the subsidiary liquid chamber 16b. In this case, as shown by arrows in FIG. 3, the movable member 23 is not directly affected by the dynamic pressure, but the movable member 23 is affected by the dynamic pressure through the flow control member 30 so that a direction and a size of a pressure gradient of the liquid L in the vicinity of the movable member 23 are changed due to the flow control member 30. Thus, for example, a deformation rate, etc. of the movable member 23 is suppressed when the movable member 23 is deformed in the axial direction to come into contact with the wall surface of the accommodating chamber 18 so that kinetic energy of the movable member 23 can be suppressed. Also, in this case, since the movable member 23 does not come into contact with the flow control member 30, abnormal noise can be suppressed.

As described above, abnormal noise can be suppressed by simply providing the flow control member 30, and abnormal noise can be suppressed without changing sizes of the communicating holes 27a and 27b or a positional relationship between the partition member 15 and the movable member 23. Therefore, abnormal noise can be suppressed while effects caused in characteristics of the vibration isolator 10 such as, for example, frequency characteristics, attenuation characteristics, and cavitation characteristics are suppressed.

Since the movable member 23 includes the fixed end 24, a portion of the movable member 23 which is farther from the fixed end 24 in the planar view is easily deformed in the axial direction. Here, since the flow control member 30 overlaps a portion of the exposed area 28 of the movable member 23 which is farthest from the fixed end 24 in the planar view in the axial direction, a portion of the exposed area 28 which is most easily deformed in the axial direction can be suppressed from being directly affected by the dynamic pressure of the liquid L. Thus, abnormal noise can be effectively suppressed.

Also, the flow control member 30 overlaps a portion of the exposed area 28 of the movable member 23 at the front side in the axial direction and extends in a direction around the hole axis O1 of the first communicating hole 27a. Thus, a portion of the exposed area 28 of the movable member 23 which is easily deformed in the axial direction can be covered by the flow control member 30 over a wide range so that abnormal noise can be effectively suppressed.

Note that the technical scope of the present invention is not limited to the embodiments and can be modified in various ways without departing from the gist of the present invention.

For example, while the first concave portion 17a, the second concave portion 17b, the thin portion 19, and the restriction passage 20 are provided in the embodiment, they may be omitted.

The flow control member 30 overlaps the portion of the exposed area 28 of the movable member 23 which is farthest from the fixed end 24 in the planar view in the axial direction in the embodiment, but the present invention is not limited thereto.

The flow control member 30 is disposed to overlap the movable member 23 in the axial direction through the first communicating hole 27a in the embodiment, but the present invention is not limited thereto. For example, the flow control member 30 may be disposed to overlap the movable member 23 in the axial direction through the second communicating holes 27b. In this case, the flow control member 30 may not be disposed to overlap the movable member 23 in the axial direction through the first communicating hole 27a.

A size, a material, rigidity, etc. of the flow control member 30 can also be appropriately changed. A surface of the flow control member 30 may be even or uneven. The flow control member 30 can also be integrally formed with the partition member 15.

The second communicating holes 27b directly couple the accommodating chamber 18 and the subsidiary liquid chamber 16b in the axial direction in the embodiment, but the present invention is not limited thereto. For example, ends of the second communicating holes 27b of the outside in the axial direction may be communicated with the subsidiary liquid chamber 16b through another flow path extending in a direction perpendicular to the central axis O. An end of the first communicating hole 27a of the outside in the axial direction can also be communicated with the main liquid chamber 16a through the other flow path extending in the direction perpendicular to the central axis O when the flow control member 30 is not disposed to overlap the movable member 23 in the axial direction through the first communicating hole 27a.

A different constitution from the embodiment may be adopted as the accommodating chamber 18. For example, the accommodating chamber 18 may have the same size in the axial direction over the entire length of the forward and rearward directions. The accommodating chamber 18 may be open toward both sides in the radial direction surrounding the central axis O and may be closed throughout the entire circumference.

A different constitution from the embodiment may be adopted as the movable member 23. For example, a central portion (the fixed portion) in the planar view in the movable member 23 may be fixed in the axial direction. The movable member 23 may be displaceably accommodated in the accommodating chamber 18 in the axial direction, and another constitution in which the movable member 23 is accommodated in the accommodating chamber 18 deformably or displaceably in the axial direction can also be appropriately adopted.

The case in which the second attachment member 12 and the engine are connected and the first attachment member 11 and the vehicle body are connected has been described in the embodiment. However, the present invention is not limited thereto, a constitution in which these connections are reversed is also possible, and the vibration isolator 10 may be installed at another vibration-generating part or vibration-receiving part.

In addition, the constituent elements of the above-described embodiment can be appropriately replaced with well-known constituent elements without departing from the gist of the present invention, and appropriately combined with the modified example described above.

INDUSTRIAL APPLICABILITY

According to the present invention, abnormal noise occurring with input from the vibration-generating part can be suppressed.

REFERENCE SIGNS LIST

10: vibration isolator
11: first attachment member
12: second attachment member
13: elastic body
15: partition member
16: liquid chamber
16a: main liquid chamber
16b: subsidiary liquid chamber
18: accommodating chamber
23: movable member
24: fixed end (fixed portion)
27a: first communicating hole (direct coupling hole)
27b: second communicating hole (direct coupling hole)
28: exposed area
30: flow control member
L: liquid
O1: hole axis

The invention claimed is:

1. A vibration isolator, comprising:
    a movable member;
    a partition member including a plurality of communicating holes extending in an axial direction of the vibration isolator from a portion of a wall surface of an accommodating chamber, the portion of the wall surface facing the movable member, the plurality of communicating holes being configured to communicate the accommodating chamber with a main liquid chamber or a subsidiary liquid chamber, and at least one of the plurality of communicating holes is a direct coupling hole configured to directly couple the accommodating chamber with the main liquid chamber or the subsidiary liquid chamber a first tubular attachment member coupled to one of a vibration-generating part and a vibration-receiving part and a second attachment member coupled to the other part;

an elastic body configured to couple the attachment members to each other;

the partition member configured to divide a liquid chamber in the first attachment member in which a liquid is sealed into the main liquid chamber having the elastic body as a portion of a wall surface and the subsidiary liquid chamber;

the movable member accommodated in the accommodating chamber provided at the partition member deformably or displaceably in the axial direction of the first attachment member; and a flow control member positioned farther from the movable member in the axial direction than the direct coupling hole, and the flow control member disposed to overlap the movable member in the axial direction through the direct coupling hole, wherein the flow control member does not come into contact with the movable member deformed or displaced in the axial direction when a liquid pressure of the main liquid chamber varies based on an input from the vibration-generating part, and wherein the movable member includes an exposed area, in which the movable member is exposed to the main liquid chamber or the subsidiary liquid chamber by the direct coupling hole, a part of the exposed area overlaps a portion of the flow control member in the axial direction, and another part of the exposed area does not overlap the flow control member in the axial direction.

2. The vibration isolator according to claim 1, wherein the movable member includes a fixed portion fixed to the partition member in the axial direction and is formed deformably in the axial direction, and the flow control member overlaps a portion that is farthest from the fixed portion in a planar view of the partition member when viewed from the axial direction in an exposed area exposed from the direct coupling hole in the axial direction in the movable member in the axial direction.

3. The vibration isolator according to claim 2, wherein the exposed area of the movable member is disposed on a hole axis of the direct coupling hole, and the fixed portion is provided at a portion other than the exposed area, and the flow control member overlaps a portion positioned at an opposite side of the fixed portion surrounding the hole axis in the exposed area in the axial direction and extends in a direction around the hole axis.

4. A vibration isolator, comprising:

a movable member;

a partition member including in which a plurality of communicating holes extending outward in an axial direction of the vibration isolator from a portion of a wall surface of an accommodating chamber, the portion of the wall surface facing the a movable member in the axial direction in a wall surface of an accommodating chamber, the plurality of communicating holes being and configured to communicate the accommodating chamber with a main liquid chamber or a subsidiary liquid chamber are provided in a partition member, and at least one of the plurality of communicating holes is a direct coupling hole configured to directly couple the accommodating chamber with the main liquid chamber or the subsidiary liquid chamber in the axial direction, a first tubular attachment member coupled to one of a vibration-generating part and a vibration-receiving part and a second attachment member coupled to the other part;

an elastic body configured to couple the attachment members to each other;

the partition member configured to divide a liquid chamber in the first attachment member in which a liquid is sealed into the main liquid chamber having the elastic body as a portion of a wall surface and the subsidiary liquid chamber;

the movable member accommodated in the accommodating chamber provided at the partition member deformably or displaceably in the axial direction of the first attachment member; and a flow control member positioned farther from the movable member in the axial direction than the direct coupling hole, and the flow control member disposed to overlap the movable member in the axial direction through the direct coupling hole, wherein the flow control member does not come into contact with the movable member deformed or displaced in the axial direction when a liquid pressure of the main liquid chamber varies based on an input from the vibration-generating; part, and wherein the flow control member is formed by a rigid body.

* * * * *